US008000955B2

(12) United States Patent
Jiang et al.

(10) Patent No.: US 8,000,955 B2
(45) Date of Patent: Aug. 16, 2011

(54) GENERATING CHINESE LANGUAGE BANNERS

(75) Inventors: Long Jiang, Beijing (CN); Ming Zhou, Beijing (CN); Su Hao, Beijing (CN)

(73) Assignee: Microsoft Corporation, Redmond, WA (US)

( * ) Notice: Subject to any disclaimer, the term of this patent is extended or adjusted under 35 U.S.C. 154(b) by 892 days.

(21) Appl. No.: 11/788,448

(22) Filed: Apr. 20, 2007

(65) Prior Publication Data

US 2008/0154580 A1    Jun. 26, 2008

Related U.S. Application Data

(60) Provisional application No. 60/876,085, filed on Dec. 20, 2006.

(51) Int. Cl.
G06F 17/27 (2006.01)
(52) U.S. Cl. .................. 704/9; 704/1; 704/2; 704/4
(58) Field of Classification Search ............... 704/9, 1, 704/2, 4
See application file for complete search history.

(56) References Cited

U.S. PATENT DOCUMENTS

| | | | | |
|---|---|---|---|---|
| 4,712,174 A | * | 12/1987 | Minkler, II | 704/1 |
| 4,942,526 A | * | 7/1990 | Okajima et al. | 704/10 |
| 5,930,746 A | | 7/1999 | Ting | 704/9 |
| 6,647,395 B1 | * | 11/2003 | Kurzweil et al. | 707/102 |
| 6,941,262 B1 | * | 9/2005 | Kurzweil et al. | 704/9 |
| 7,184,949 B2 | * | 2/2007 | Kurzweil et al. | 704/9 |
| 7,269,802 B1 | * | 9/2007 | Kurzweil et al. | 715/867 |
| 2003/0036040 A1 | * | 2/2003 | Kurzweil et al. | 434/169 |
| 2003/0083861 A1 | | 5/2003 | Weise | 704/9 |
| 2004/0122660 A1 | * | 6/2004 | Cheng et al. | 704/10 |
| 2005/0071148 A1 | | 3/2005 | Huang et al. | |
| 2005/0080781 A1 | * | 4/2005 | Ryan et al. | 707/5 |
| 2005/0210058 A1 | * | 9/2005 | Kurzweil et al. | 707/102 |
| 2007/0204211 A1 | * | 8/2007 | Paxson | 715/501.1 |
| 2007/0294223 A1 | * | 12/2007 | Gabrilovich et al. | 707/3 |

OTHER PUBLICATIONS

Manurung, H. M. (2003). An Evolutionary Algorithm Approach to Poetry Generation. PhD thesis, Division of Informatics, University of Edinburgh.*
Kurzweil's Cybernetic Poet, How it works. Retrieved from http://www.kurzweilcyberart.com/poetry/rkcp_how_it_works.php3 2000.*
Shen, L., Sarkar, A., and Och, F. J. (2004). Discriminative reranking for machine translation. In Proc. HLTNAACL 2004.*

(Continued)

*Primary Examiner* — Richemond Dorvil
*Assistant Examiner* — Greg Borsetti
(74) *Attorney, Agent, or Firm* — Westman, Champlin & Kelly, P.A.

(57) ABSTRACT

Embodiments are disclosed for automatically generating a banner given a first scroll sentence and a second scroll sentence of a Chinese couplet. The first and/or second scroll sentence can be generated by an automatic computer system or by a human (e.g., manually generated and then provided as input to an automated banner generation system) or obtained from any source (e.g., a book) and provided as input. In one embodiment, an information retrieval process is utilized to identify banner candidates that best match the first and second scroll sentences. In one embodiment, candidate banners are automatically generated. In one embodiment, a ranking model is applied in order to rank banner candidates derived from the banner search and generation processes. One or more banners are then selected from the ranked banner candidates.

12 Claims, 5 Drawing Sheets

OTHER PUBLICATIONS

Ying Zhang, Phil Vines, Using the web for automated translation extraction in cross-language information retrieval, Proceedings of the 27th annual international ACM SIGIR conference on Research and development in information retrieval, Jul. 25-29, 2004, Sheffield, United Kingdom.*

Blank. "AI update" ACM 2001.*

Harrell, D. F. 2006. Walking blues changes undersea: Imaginative narrative in interactive poetry generation with the griot system. In AAAI 2006 Workshop in Computational Aesthetics: Artificial Intelligence Approaches to Happiness and Beauty. Boston, MA: AAAI Press.*

P. Gervás. An expert system for the composition of formal Spanish poetry. Journal of Knowledge-Based Systems, 14(3-4):181-188, 2001.*

N. Mamede, I. Trancoso, P. Arajo, and C. Viana, "An Electronic Assistant for Poetry Writing," In the Proc. of the 9th Ibero-American Conf. on Artificial Intelligence, LNCS 3315, pp. 286-294, 2004.*

Somers, H. (1999). Review article: example-based machine translation. Machine Translation 14: 113-157.*

Steve Richardson, W. Dolan, A. Menezes, and J. Pinkham. 2001. Achieving commercial-quality translation with example-based methods. In Proceedings of MT Summit VIII, Santiago De Compostela, Spain, pp. 293-298.*

Gervás, P. 2001. Generating poetry from a prose text: Creativity versus faithfulness. In Wiggins, G., ed., Proceedings of the AISB'01 Symposium on Artificial Intelligence and Creativity in Arts and Science, 93-99.*

Mamede et al. "Poetry Assistant" 2004.*

Callison-Burch et al. "A Program for Automatically Selecting the Best Output from Multiple Machine Translation Engines" 2001.*

Manurun et al. "Towards A Computational Model Of Poetry Generation" 2000.*

Doddington. "Automatic Evaluation of Machine Translation Quality Using N-gram Co-Occurrence Statistics" 2002.*

Gervas. "Automatic Generation of Poetry using a CBR Approach" 2001.*

Official Search Report and the W.O. of the EPO in counterpart foreign application No. PCT/US2006/26064 filed Jul. 3, 2006.

Machine Translation by interaction between paraphraser and transfer, Int'l Conf. On Computational Linguistics, Proc. Of the 19$^{th}$ Int'l Conf. On Computational Linguistics, vol. 1, Taipei, Taiwan, pp. 1-7, 2002.

First Official Action for related Chinese Patent Application No. 200780047860.9, filed Dec. 20, 2007.

International Search Report and Int'l Preliminary Report on Patentability and Written Opinion dated Apr. 21, 2008 of Int'l Application No. PCT/US2007/088466, filed Dec. 20, 2007, resubmitted. 8 pgs.

* cited by examiner

GENERATING CHINESE LANGUAGE BANNERS

The present application is based on and claims the benefit of U.S. provisional patent application Ser. No. 60/876,085, filed Dec. 20, 2006, the content of which is hereby incorporated by reference in its entirety.

BACKGROUND

Artificial intelligence is the science and engineering of making intelligent machines, especially computer programs. Applications of artificial intelligence include game playing and speech recognition.

Chinese antithetical couplets called "dui4-lian2" (in Pinyin) are considered an important Chinese cultural heritage. The teaching of antithetical couplets was an important method of teaching traditional Chinese for thousands of years. Typically, an antithetical couplet includes two phrases or sentences written as calligraphy on vertical red banners, typically placed on either side of a door or in a large hall. Such couplets are illustratively displayed during special occasions such as weddings or during the Spring Festival, i.e. Chinese New Year. Other types of couplets include birthday couplets, elegiac couplets, decoration couplets, professional or other human association couplets, and the like.

Chinese antithetical couplets use condensed language, but have deep and sometimes ambivalent or double meaning. The two sentences making up the couplet are illustratively called the "first scroll sentence" and the "second scroll sentence."

An example of a Chinese couplet is "海阔凭鱼跃"and "天高任鸟飞"where the first scroll sentence is "海阔凭鱼跃"and the second scroll sentence is "天高任鸟飞".The correspondence between individual words of the first and second sentences is shown as follows:

| | |
|---|---|
| 海 (sea) | 天 (sky) |
| 阔 (wide) | 高 (high) |
| 凭 (allows) | 任 (enable) |
| 鱼 (fish) | 鸟 (bird) |
| 跃 (jump) | 飞 (fly) |

Antithetical couplets can be of different length. A short couplet can include one or two characters while a longer couplet can reach several hundred characters. The antithetical couplets can also have diverse forms or relative meanings. For instance, one form can include first and second scroll sentences having the same meaning. Another form can include scroll sentences having the opposite meaning. However, no matter which form, Chinese couplets generally conform to rules or principles such as the following:

Principle 1: The two sentences of the couplet generally have the same number of words and total number of Chinese characters. Each Chinese character has one syllable when spoken. A Chinese word can have one, two or more characters, and consequently, be pronounced with one, two or more syllables. Each word of a first scroll sentence should have the same number of Chinese characters as the corresponding word in the second scroll sentence.

Principle 2: Tones (e.g. "Ping" (平) and "Ze" (仄)in Chinese) are generally coinciding and harmonious. The traditional custom is that the character at the end of first scroll sentence should be "仄"(called tone "Ze" in Chinese). This tone is pronounced in a sharp downward tone. The character at the end of the second scroll sentence should be "平"(called tone "Ping" in Chinese). This tone is pronounced with a level tone.

Principle 3: The parts of speech of words in the second sentence should be identical to the corresponding words in the first scroll sentence. In other words, a noun in the first scroll sentence should correspond to a noun in the second scroll sentence. The same would be true for a verb, adjective, number-classifier, adverb, and so on. Moreover, the corresponding words must be in the same position in the first scroll sentence and the second scroll sentence.

Principle 4: The contents of the second scroll sentence should be mutually inter-related with the first scroll sentence and the contents cannot be duplicated in the first and second scroll sentences.

In some cases, couplets are accompanied by a banner (a.k.a., a streamer), typically horizontally placed above a door between the vertical couplet banners. A banner, most commonly a phrase composed of 4 Chinese characters, is used to attach with a couplet to summarize, emphasize and complement the meaning of the couplet. Although the length of a banner can vary from 2 characters to 5 or 6 characters, a banner most typically has 4 characters. A basic requirement for a banner is that its meaning should fit the meaning of the first and second scroll sentences. For example, the banner for the couplet "冬去山明水秀,春来鸟语花香。"is "大地回春".Literally translated as "winter goes by, the mountain is bright and the river is beautiful; spring comes, then bird is singing and the flowers smell good".

However, no matter which form, a banner for a Chinese couplet generally conforms to rules or principles such as the following:

Principle 1: The banner generally consists of 4 Chinese characters. In a minority of cases, a banner consists of 2, or 3, or 5 or more characters. Each Chinese character generally has one syllable when spoken.

Principle 2: Tones are generally coinciding and harmonious. But normally, there is no strict requirement in terms of the correspondence between banner and either first scroll of sentence or second scroll of sentence.

Principle 3: The content of the banner should be mutually inter-related with the first and second scroll sentences, and the content generally cannot be duplicated in the first and second scroll sentences.

Chinese-speaking people often engage in creating new couplets and banner as a form of entertainment. One form of recreation is one person makes up a first scroll sentence and challenges others to create, on the spot, an appropriate second scroll sentence. A further challenge is sometimes made to create the banner after the first and second scroll sentence are given. Thus, creating banners, like creating second scroll sentences, challenges participants' linguistic, creative, and other intellectual capabilities.

In general, an automatic generation of second scroll sentences (e.g., given a first scroll sentence) and/or banners (e.g., given first and second scroll sentences) would be an appropriate and well-regarded application of artificial intelligence.

The discussion above is merely provided for general background information and is not intended to be used as an aid in determining the scope of the claimed subject matter.

SUMMARY

Embodiments disclosed herein pertain to methods for automatically generating a banner given a first scroll sentence and a second scroll sentence of a Chinese couplet. The first and/or second scroll sentence can be generated by an automatic computer system or by a human (e.g., manually generated and then provided as input to an automated banner generation system) or obtained from any source (e.g., a book) and provided as input. In one embodiment, an information retrieval process is utilized to identify banner candidates that best match the first and second scroll sentences. In one embodiment, candidate banners are automatically generated. In one embodiment, a ranking model is applied in order to rank banner candidates derived from the banner search and generation processes. One or more banners are then selected from the ranked banner candidates.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
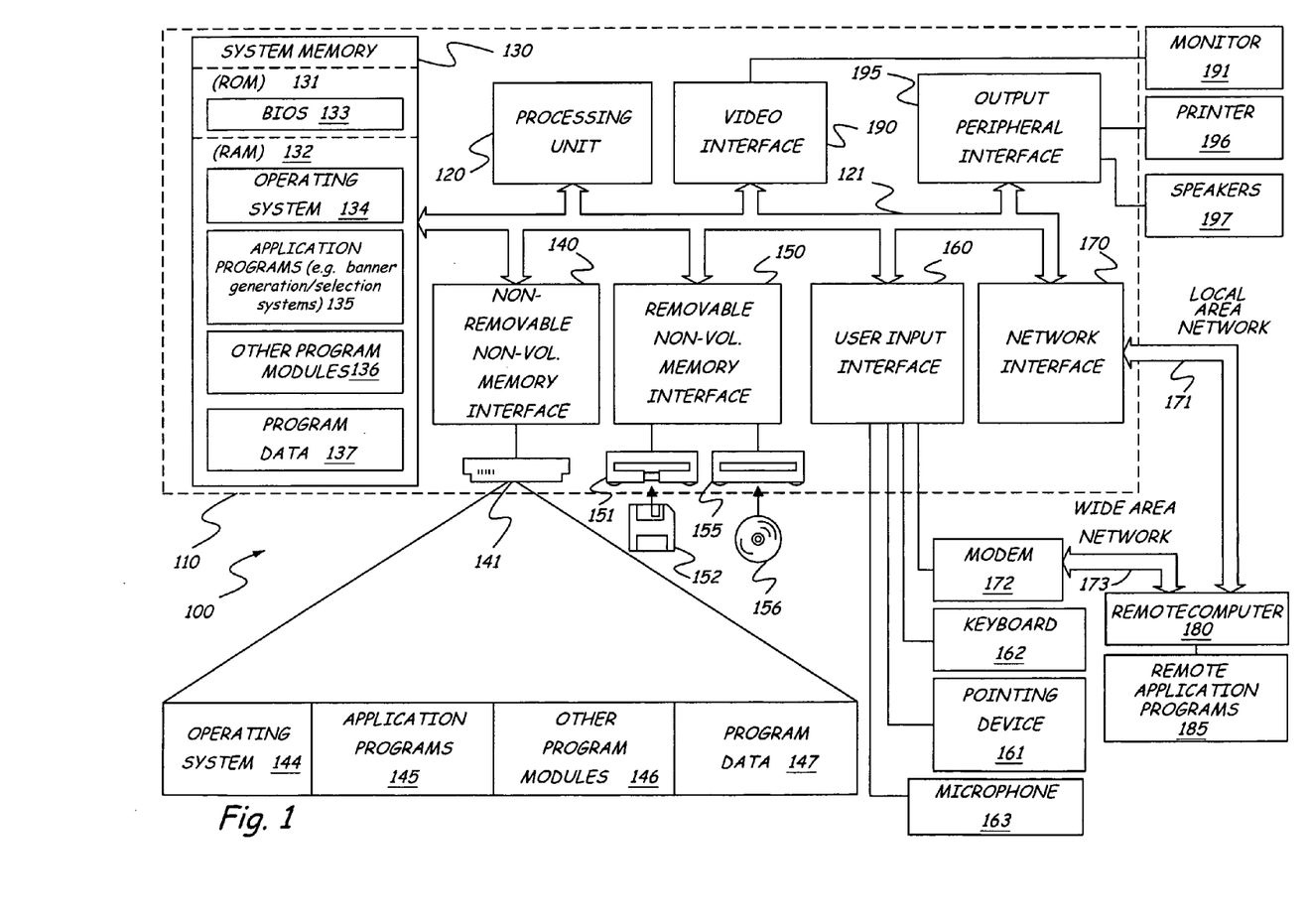
FIG. 1 is a block diagram of a computing environment.

Before addressing embodiments of banner generation systems and methods, it may be helpful to describe generally computing devices that can be used for practicing the various embodiments described herein. FIG. 1 illustrates an example of a suitable computing system environment 100 in which the embodiments may be implemented. The computing system environment 100 is only one example of a suitable computing environment and is not intended to suggest any limitation as to scope of use or functionality. Neither should the computing environment 100 be interpreted as having any dependency or requirement relating to any one or combination of components illustrated in the exemplary operating environment 100.

The embodiments are operational with numerous other general purpose or special purpose computing system environments or configurations. Examples of well known computing systems, environments, and/or configurations that may be suitable for use with embodiments disclosed herein include, but are not limited to, personal computers, server computers, hand-held or laptop devices, multiprocessor systems, microprocessor-based systems, set top boxes, programmable consumer electronics, network PCs, minicomputers, mainframe computers, telephone systems, distributed computing environments that include any of the above systems or devices, and the like.

The embodiments may be described in the general context of computer-executable instructions, such as program modules, being executed by a computer. Generally, program modules include routines, programs, objects, components, data structures, etc. that perform particular tasks or implement particular abstract data types. Those skilled in the art can implement the description and figures provided herein as processor executable instructions, which can be written on any form of a computer readable medium.

The embodiments may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the embodiments include a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137. Programs 135 are shown as possibly including a banner generation system, embodiments of which will be described herein in detail. This is but one example of where in environment 100 such systems might be implemented. Other implementations (e.g., as part of programs 145 or 185) should also be considered within the scope of the present invention.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
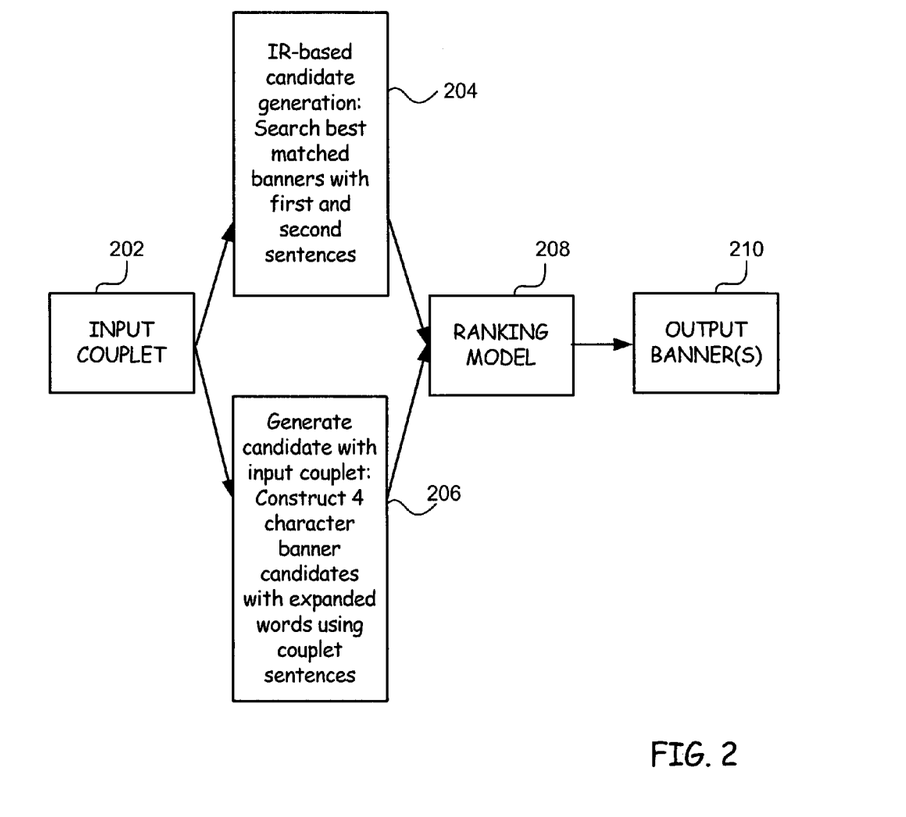
FIG. 2 is a broad overview of a process for generating banners.

FIG. 2 is a schematic overview of a process for generating banners. Banners with four characters are generally most common. Thus, in the present description, embodiments will be described in the context of four character banners. However, the scope of the present invention is not so limited. The same or similar concepts can just as easily be applied in the context of banners with other than four characters.

In accordance with block 202, first and second scroll sentences are provided as input. In accordance with blocks 204 and 206, two different methods are employed to produce banner candidates. In accordance with block 208, a ranking model is applied, for example to support selection of the N-best banners from the generated candidates. Output banner or banners 210 are selected from the N-best banners.

As is indicated by block 204, some banner candidates are produced utilizing an information retrieval based approach. At least because of a relatively high recurrence of common banners, it can be worthwhile to produce banner candidates by searching a database of existing banners.

In one embodiment, in preparation of a search process, a taxonomy of banners is built and filled by existing banners collected from external sources (e.g., books, Internet, etc.). Then, for a given couplet, the taxonomy is searched with the couplet sentences (first and second sentences) in order to produce a set of best matched candidate banners.

Figure 3:
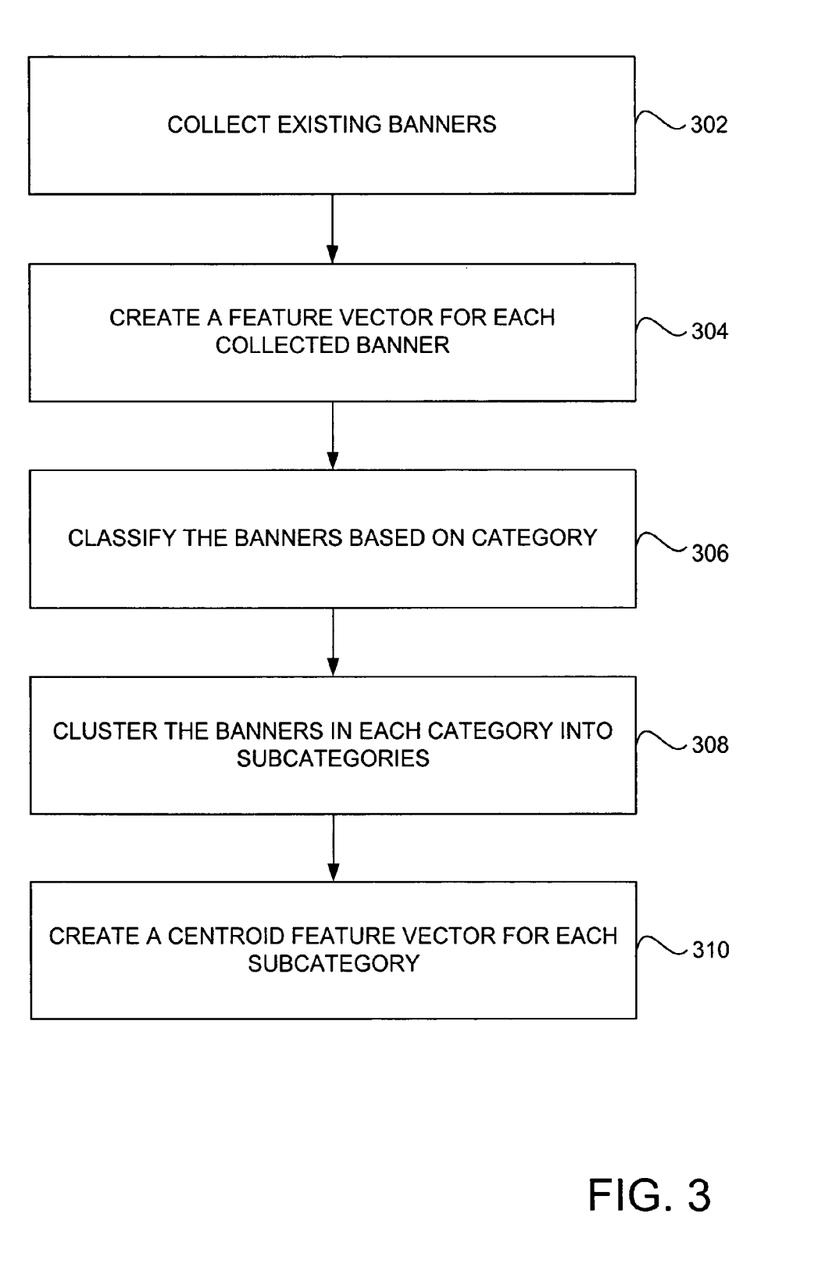
FIG. 3 is a flow chart diagram demonstrating steps associated with constructing a banner taxonomy.

FIG. 3 is a flow chart diagram demonstrating steps associated with constructing a banner taxonomy. In step 302, 4-character banners are collected. Each banner illustratively uses a phrase that, for example, has been used as a banner before, are an idiom, and/or happen to be a high-frequency 4-character phase. Those skilled in the art will appreciate that these types of phrases can be obtained from a wide variety of different sources. The scope of the present invention is not limited to one particular source or combination of sources.

In step 304, a feature vector is created for each collected banner. The feature vector illustratively serves to identify an associated meaning. In one embodiment, the creation of feature vectors involves first searching the collected banners with a web search engine and collecting returned top N snippets. These snippets can be further combined with information retrieved from one or more additional sources (e.g., a news corpus) to enhance coverage and therefore form a new larger corpus. Once the corpus is complete, then, for each banner, words that co-occur within a fixed-size window in the corpus are collected as feature words. In one embodiment, the weight of each feature word is decided by the mutual information (see the following equation) between the feature word and the candidate banner in the new corpus.

$$MI(w, c_i) = p(w, c_i) \log \frac{p(w, c_i)}{p(w)p(c_i)} \qquad \text{Eq. 1}$$

Where, ci is a banner and w is a word, p(w)=count(w)/N, and p(w,ci)=count(w,ci)/N. And where N is the size of training corpus in terms of number of words, count (w) is the frequency of word w appearing in training corpus, and count (w,ci) is the frequency of w and ci co-occurring within a fix-size window in the training corpus.

In accordance with step 306, the collected banners are divided into semantic categories (e.g., 14 categories). In one embodiment, this sorting is done through human intervention (e.g., categorizing is done by human experts). In one embodiment, the categories are defined by human experts, such as banners for Spring Festival, banners for birthday, banners for wedding ceremony, banners to celebrate success, etc. In one embodiment, a single banner is allowed to belong to multiple categories.

In accordance with step 308, the collected banners are automatically clustered within the categories into subcategories. In one embodiment, this is done using K-Means Clustering. The distance measure between two candidate banners used in clustering is illustratively defined as the cosine value of their feature vectors, i.e., $$\text{Cosine}(V1, V2) = \frac{V1 \cdot V2}{|V1| \times |V2|} \quad \text{Eq. 2}$$

Where, V1 and V2 represent the feature word vectors of the two banner candidates respectively.

In accordance with step 310, a centroid feature vector is created for each subcategory. In one embodiment, this is done by averaging the member vectors of the subcategory, i.e., $$Vcen = \frac{1}{N}\sum_{i=1}^{N} Vi \quad \text{Eq. 3}$$

Where, Vcen is the centroid feature vector and the Vi is one of the member vectors in a subcategory. And where N is the number of members of the subcategory.

Figure 4:
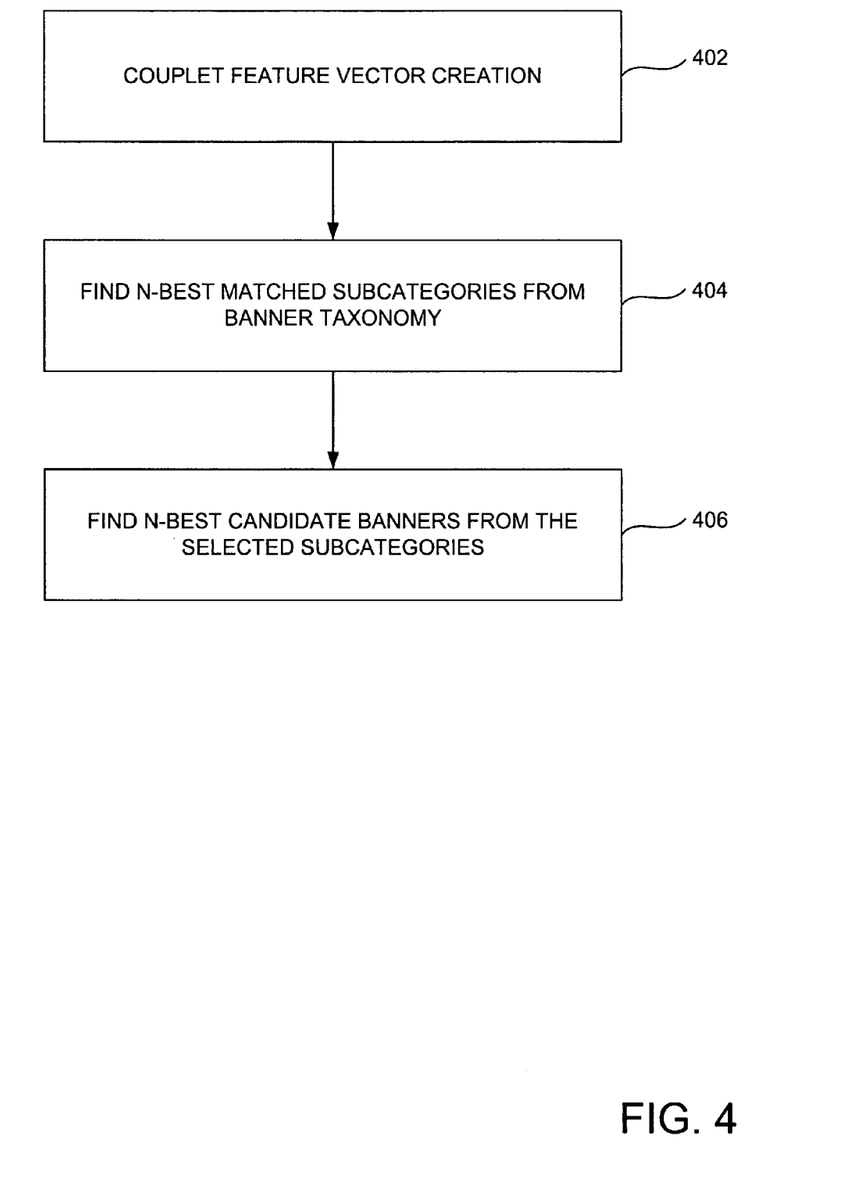
FIG. 4 is a flow chart diagram demonstrating steps associated with finding, for a given couplet, its best matched candidate banners.

FIG. 4 is a flow chart diagram demonstrating steps associated with using the constructed taxonomy to, for a given couplet, find its best matched candidate banners. In accordance with step 402, the feature vector of the input couplet is created using the words included in the couplet. In one embodiment, the weight of each word in the feature vector is the frequency of the word appearing in the couplet.

In accordance with step 404, a distance is calculated between the couplet feature vector and the centroid feature vector of each subcategory in the banner taxonomy. Referring to equation 2, V1 and V2 represent the couplet feature vector and the centroid feature vector of each subcategory in the banner taxonomy respectively. A number n subcategories with the minimum distance are illustratively selected.

In accordance with step 406, the distance is calculated between the couplet feature vector and the feature vector of each banner in the selected n subcategories. Here, V1 and V2 represent the couplet feature vector and the feature vector of each candidate banner in the selected n subcategories respectively. Finally, n candidate banners with the minimum distance are selected. The n selected candidate banners are used for the ranking model, which will be described in greater detail below.

Figure 5:
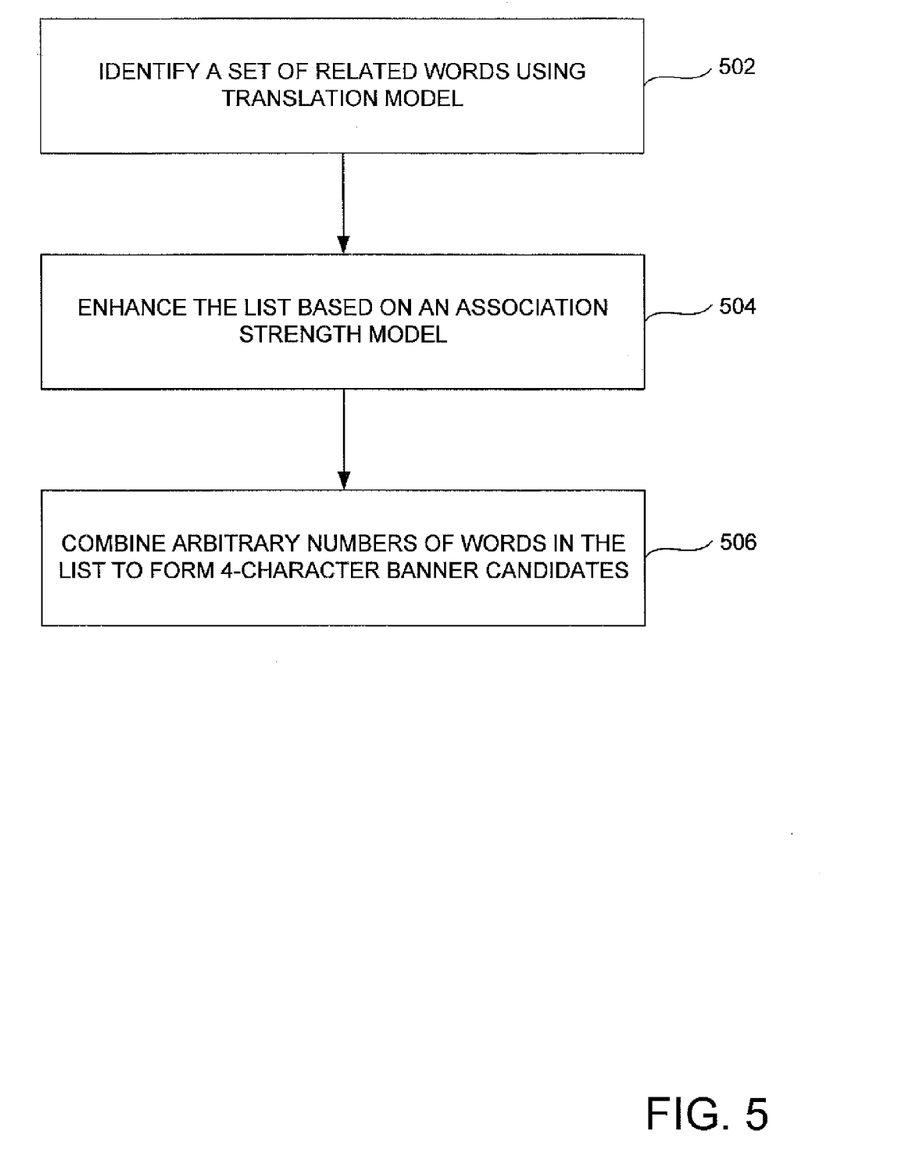
FIG. 5 is a flow chart diagram demonstrating steps associated with banner generation.

Different from the just described information retrieval method of searching for a banner from an existing taxonomy, another approach involves producing a banner using characters or words related to the input sentence and the second sentence either generated by the couplet system or by a human. FIG. 5 is a flow chart diagram demonstrating, on a high level, steps associated with this second approach to banner generation.

In accordance with step 502, related words are obtained using a translation model. In one embodiment, the model, p(a|b), is trained on a couplet corpus. For example, $$p(a|b) = \frac{\text{count}(a, b)}{\text{count}(b)} \quad \text{Eq. 4}$$

Where, count(a,b) represents the number of occurrences that a and b appear in the same position of a couplet. Count(b) represents the frequency of b appearing in training data. Using the translation model, for each word wi that appears in the given couplet, a word wj is selected into a related words list if p(wj|wi) is over a threshold.

In accordance with step 504, an association strength (AS) model is used to enhance the related words list. Given a couplet C(c1 ... cn), the association strength between a word w and the couplet C is illustratively approximated using the following formula:

$$AS(w, C) \approx \sum_{i=1}^{n} MI(w, c_i) \quad \text{Eq. 5}$$

MI (w, ci) is illustratively approximately estimated with couplet training data, i.e., $$MI(w, c_i) = p(w, c_i)\log\frac{p(w, c_i)}{p(w)p(c_i)} \quad \text{Eq. 6}$$

Where, p(w)=count(w)/N, p(w,ci)=count(w,ci)/N,
N is the size of couplet training data, count(w) is the number of couplets containing word w, and count(w,ci) is the number of couplets containing both w and ci. Based on the AS score, many related words for a given couplet can be obtained. Specifically, word w is added into a related words list if AS(w, C) if over a threshold.

In accordance with step 506, arbitrary numbers of words are combined in the list to form 4-characters banner candidates. Some or all of these candidate banners are used for the ranking model, which will now be described in greater detail.

To get the best banners, candidates from the two methods above are illustratively combined and ranked. One way to view the ranking process is as a classification process that selects acceptable banners and excludes unaccepted candidates. In one embodiment, ranking is performed with a ranking SVM model:

$$f_{w^*}(\vec{x}) = \langle \vec{w^*}, \vec{x} \rangle \quad \text{Eq. 7}$$

Where $\vec{x}$ indicates the feature vector of a banner candidate and $\vec{w}$ is the weight vector of SVM model. Features used in $\vec{x}$ illustratively can include but are not limited to (assuming B is a banner candidate):

1. p(B|LMc) according to a couplet Language Model (LM) trained on couplet data

Supposing B={b1,b2,b3,b4}, where b1,b2,b3,b4 are Chinese characters, then p(B|LMc) is illustratively computed using the following formula:

$$p(B) = p(b_1) \prod_{i=2}^{4} p(b_i|b_{i-1})$$ Eq. 8

2. p(B|LMb) according to a banner LM trained on banners data (same as above)
3. p(B|LMg) according to a general LM trained on a news corpus (same as above)
4. The association score between the banner candidate and the couplet. In one embodiment, to compute this score, the banner candidate is first segmented into words. Assuming the candidate banner is segmented into {w1, w2 ... wn}, then its association is illustratively computed using the following formula:

$$AssociationScore = \frac{1}{n} \prod_{i=1}^{n} AS(w_i, C)$$ Eq. 9

Where C is the input couplet and AS(wi,C) is the association strength between wi and C.

5. Context similarity between the banner candidate B and the couplet C. For those candidate banners obtained using information retrieval based method, their context similarity have been obtained when searching in the taxonomy. For those from generation with input couplet method, their context similarity is illustratively computed with the input couplet (e.g., using context similarity equation described above). Their feature vector can be obtained by summing up the feature vectors of their component words. To get the feature vector of each word in the vocabulary beforehand, a method similar to creation of the feature vector for candidate banners in the taxonomy is illustratively applied.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method for obtaining an output banner associated with a Chinese language input couplet, the method comprising:
    receiving the Chinese language input couplet, the Chinese language input couplet including a first sentence and a second sentence, each of the first and the second sentences having a same number of words, the words in the first sentence being different than the words in the second sentence, each of the first and the second sentences having a meaning that is different than the other sentence;
    utilizing a computer processor that is a component of a computer to identify a set of existing banners that are related to the input couplet; each of the banners in the set of existing banners having a number of words that is different than the number of words in the Chinese language input couplet sentences. each of the banners in the set of existing banners having a meaning that is different than the meaning of either the first sentence or the second sentence but that is complimentary to the meanings of the first and the second sentences;
    generating a set of banners that are related to the input couplet, each of the banners in the set of generated banners having a number of words that is different than the number of words in the Chinese language input couplet sentences, each of the banners in the set of generated banners having a meaning that is different than the meaning of either the first sentence or the second sentence but that is complimentary to the meanings of the first and the second sentences;
    generating a ranked banner set by applying a ranking model to rank the set of existing banners and the generated set of banners relative to one another based on relevancy to the input couple; and
    selecting the output banner from either the set of existing banners or the generated set of banners wherein selecting the output banner comprises selecting the output banner from the ranked banner set.

2. The method of claim 1, further comprising considering the contents of both the generated and existing sets in a determination of which banner should be the output banner.

3. The method of claim 1, wherein identifying a set of existing banners comprises generating a feature vector for each banner in the set of existing banners.

4. The method of claim 3, wherein identifying a set of existing banners further comprises constructing a banner taxonomy based on the set of existing banners and based on the feature vectors.

5. The method of claim 4, wherein identifying a set of existing banners further comprises generating a feature vector for the input couplet.

6. The method of claim 5, wherein identifying a set of existing banners further comprises comparing, through the banner taxonomy, the input couplet to the set of existing banners.

7. The method of claim 6, wherein comparing the input couplet to the set of existing banners comprises calculating a distance between the input couplet feature vector, and each of the feature vectors for the banners in the set of existing banners.

8. The method of claim 7, wherein identifying a set of existing banners further comprises identifying at least one banner in the set of existing banners as being a better match candidate banner than another of the banners in the set of existing banners.

9. The method of claim 8, wherein constructing a banner taxonomy comprises classifying the set of existing banners based on category.

10. The method of claim 9, wherein constructing a banner taxonomy further comprises dividing the banners in a category into subcategories.

11. The method of claim 10, wherein constructing a banner taxonomy further comprises creating a centroid feature vector for each subcategory.

12. The method of claim 11, wherein comparing the input couplet to the set of existing banners further comprises categorizing the input couplet.

* * * * *